US005319797A

United States Patent [19]

Salter et al.

[11] Patent Number: 5,319,797

[45] Date of Patent: Jun. 7, 1994

[54] REMOTE VEHICLE ACCESS FEATURING HIGH SECURITY

[75] Inventors: David A. Salter, Rochester Hills; Thomas Fleissner, Warren, both of Mich.

[73] Assignee: Rockwell International Corporation, Pittsburgh, Pa.

[21] Appl. No.: 947,199

[22] Filed: Sep. 17, 1992

[51] Int. Cl.[5] .......................... H04B 7/12; G08C 19/14

[52] U.S. Cl. .......................... 455/38.2; 455/92; 455/110; 340/825.72; 340/825.74

[58] Field of Search .................. 455/92, 95, 100, 110, 455/118, 38.1, 38.2; 340/825.63, 825.64, 825.69, 825.71, 825.72, 825.73, 825.74, 825.75, 825.76; 375/22, 23, 25, 45, 48

[56] References Cited

U.S. PATENT DOCUMENTS 4,725,827 2/1988 Gallegos .............................. 455/95
4,794,622 12/1988 Isaacman et al. .................... 375/22

FOREIGN PATENT DOCUMENTS 0100795 7/1980 Japan .............................. 340/825.72

*Primary Examiner*—Reinhard J. Eisenzopf
*Assistant Examiner*—Mark D. Wisler

[57] ABSTRACT

A remote signal transmitter capable of producing a radio frequency signal for implementation of access commands including an oscillator circuit which is alternatively capable of producing a fixed frequency signal or a modulated frequency signal as a result of selective biasing by a microprocessor. The oscillator signal is broadcast as a series of data bits which achieve a unique signature as a result of the sequence in which the fixed and modulated signals are broadcast. In addition, the signals may be broadcast for various durations which are representative of digital zeros and ones. A receiver detects the presence of the fixed and modulated signals and digital values thereof by comparison with stored values. In this manner a friend/foe screen is implemented which then permits implementation of a command contained in the remainder of the data bit stream.

17 Claims, 3 Drawing Sheets

REMOTE VEHICLE ACCESS FEATURING HIGH SECURITY

BACKGROUND OF THE INVENTION

1. Field of the Invention

The present invention relates to a method and system for transmitting a unique signal to a remote device and implementing a respective command, and more particularly, wherein the signal contains both fixed frequency and modulated frequency components which enhance the security of the command implementation.

2. Description of the Related Art

The present invention relates to techniques to prevent duplication of a signal utilized to communicate an implementation command to provide remote vehicle access as well as to remotely control various functions onboard a vehicle. Vehicle access codes used to accomplish such communication are susceptible to unauthorized recordation and duplication. That is, the access code of a transmitter can be duplicated by unauthorized individuals permitting unauthorized access to the vehicle. Such is especially prevalent in radio frequency remote vehicle access devices as recordation can be made with conventional magnetic tape recording devices which may then readily reproduce the signal as desired permitting unauthorized access.

An approach to prevent such duplication is to implement a rolling code. In such a system, the transmitter and receiver each advance to identical new codes each time the unit is used. The receiver ignores previously acceptable codes. Therefore, if a code is recorded by an unauthorized individual, the next time the system is used, the receiver has changed to a new code ignoring the sequentially prior code. The increased security provided by use of a rolling code comes at the cost of some inconvenience. That is, the rolling code in the transmitter and the receiver may not stay synchronized, as the transmitter may be actuated beyond the range of the receiver resulting in an increment or roll of the code stored in the transmitter without a corresponding roll of the receiver code. In this case, if the transmitter is within the look ahead range of the receiver, the receiver code will be advanced until a match occurs. However, if the transmitter is beyond the look ahead range, user action will be required. Therein lies the inconvenience as complicated techniques must be utilized to resynchronize the transmitter and receiver pair. In addition, such resynchronization techniques are required when the transmitter battery is charged.

Additionally, there are techniques to accomplish friend/foe detection by use of multiple frequency signals. One of such techniques involves superimposing the command with a jamming signal. Another technique utilizes two signals which appear in a predetermined sequence to establish a friend/foe screen. The screen is passed only if the two signals are detected thus opening a window through which a subsequently received command containing a unique code is received thereby implementing the respective command. Each of these dual signal techniques require use of systems capable of transmitting and receiving dual signals which results in added cost. Therefore, there is a need for a low cost uncomplicated system to achieve a secure remote vehicle access.

In communicating a command from a remote handheld transmitter to a fixed receiver on-board a vehicle, an oscillator is typically used to generate a radio frequency signal. Receivers utilized for such purposes have fixed band widths, whereas remotely operable handheld oscillators are typically not stable due to the variety of operating conditions and manufacturing tolerances encountered. When such an oscillator wanders outside the band width of the receiver, the received signal strength diminishes and ultimately fails. Stability may be achieved by incorporating a stabilizer in the oscillator circuit. A transmitter incorporating a stabilizer may then be utilized to generate a pulse train which communicates a code to implement a command. Such a pulse train is easily copied and reproduced permitting unauthorized access to the vehicle. An object of the present invention is to impede the ability to copy such signals in a low cost system.

SUMMARY OF THE PRESENT INVENTION

The present invention features a remote signal transmitter capable of producing a radio frequency signal for implementation of access commands including an oscillator circuit which is alternatively capable of producing a fixed frequency signal or a modulated frequency signal as a result of selective biasing by a microprocessor. The oscillator signal is broadcast as a series of data bits which achieve a unique signature as a result of the sequence in which the fixed and modulated signals are broadcast. In addition, the signals may be broadcast for various durations which are representative of digital zeros and ones. A receiver detects the presence of the fixed and modulated signals and digital values thereof by comparison with stored values. In this manner a friend/foe screen is implemented which then permits implementation of a command contained in the remainder of the data bit stream.

These and other aspects of the present invention will become more readily apparent by reference to the following detailed description of the embodiments as shown in the drawings.

DETAILED DESCRIPTION OF THE PREFERRED EMBODIMENT

Figure 1:
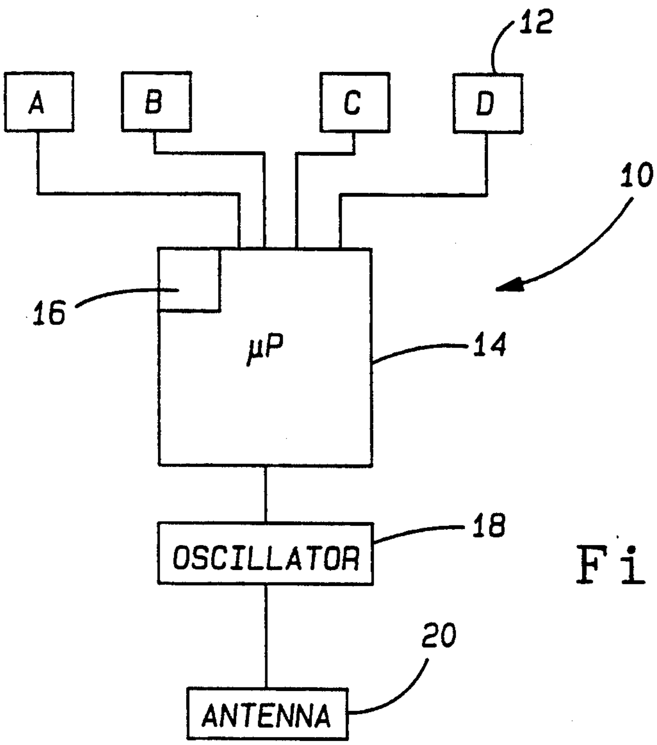
FIG. 1 is a block diagram of the transmitter of the present invention.

The preferred embodiment of the present invention, as illustrated in FIG. 1 in block diagram form, includes a transmitter 10 featuring command inputs 12*a, b, c* and *d*, which may be used to selectively provide input signals to microprocessor 14. In the preferred embodiment of the present invention, microprocessor 14 comprises a MOTOROLA 68HCO5J1 having inputs 12*a, b, c* and *d* which comprise conventional contact type switches. Closure of any of the contact switches produces an input signal which represents a command which causes memory 16 to produce a series of signals having a unique signature which correspond to the respective input command which is then supplied to oscillator 18 which implements the series of signals in the form of radio frequency signals suitable for broadcast by antenna 20.

Figure 2:
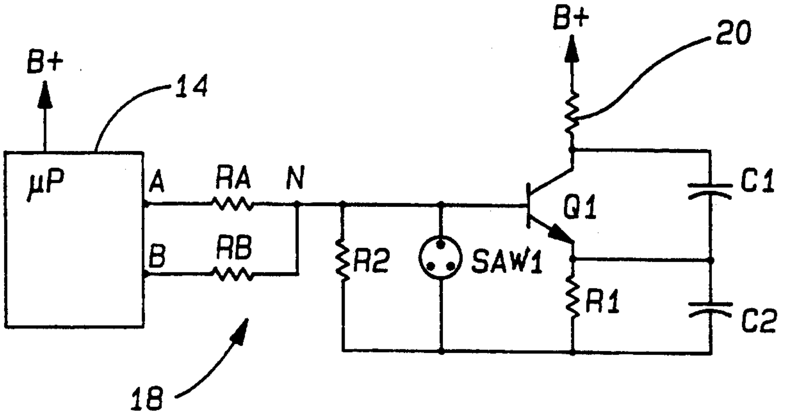
FIG. 2 is a schematic of the transmitter of the present invention.
Figure 3:
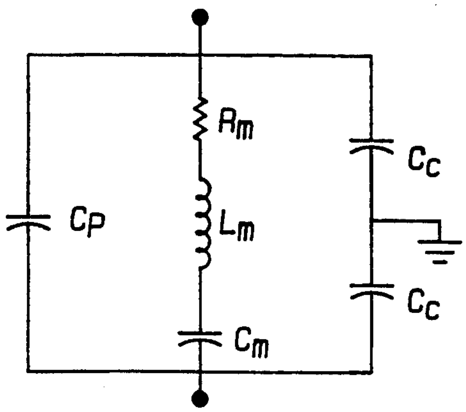
FIG. 3 is an equivalent model of the surface acoustic wave resonator of the present invention.
Figure 4:
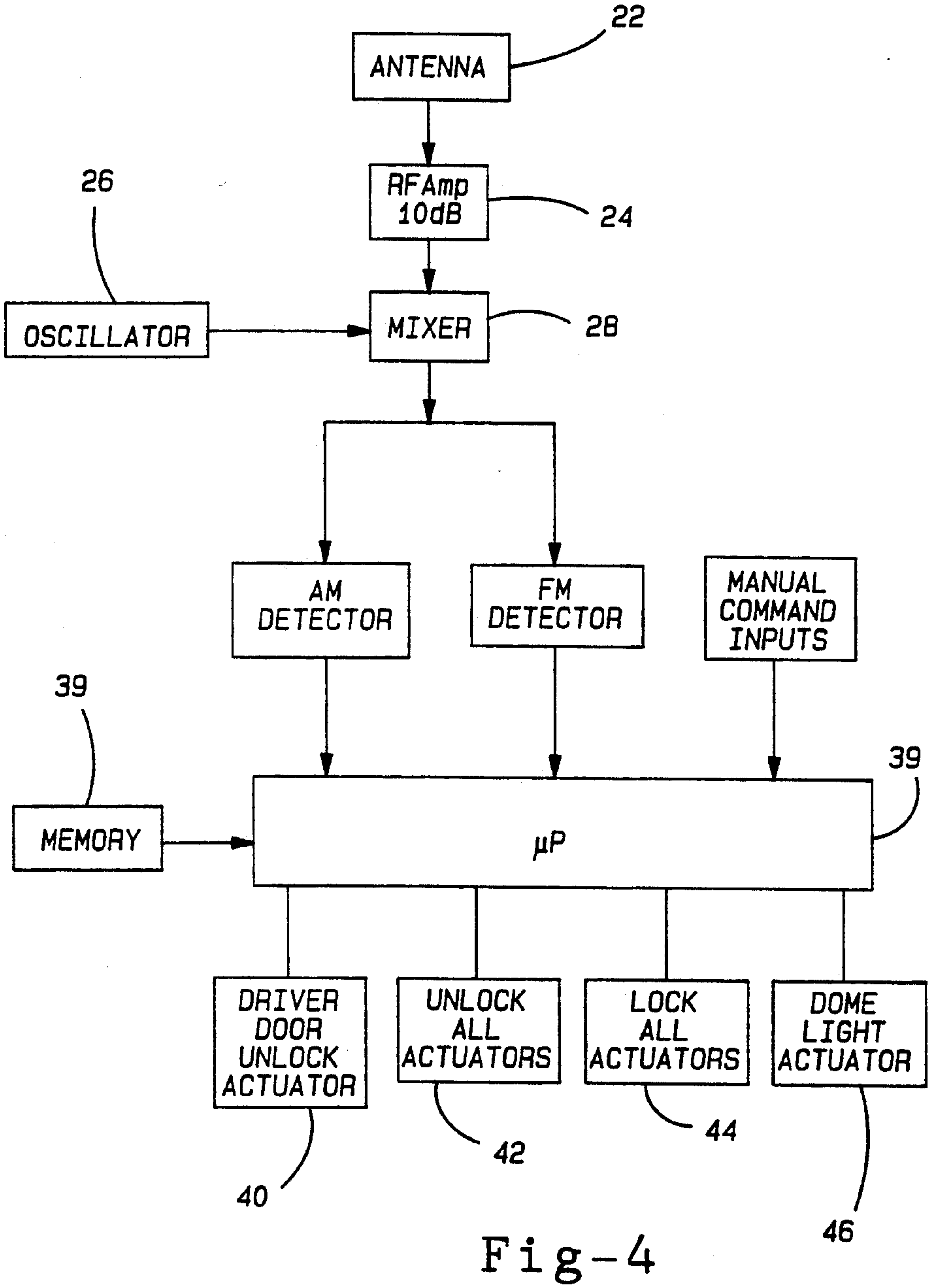
FIG. 4 is a block diagram of the receiver of the present invention.
Figure 6:
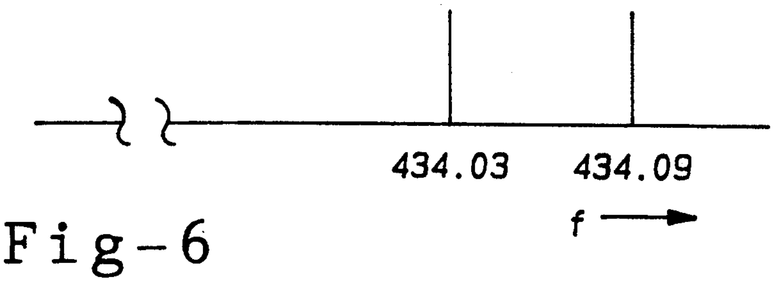
FIG. 6 is a linear representation of the first and second fixed frequency signals of the present invention.
Figure 7:
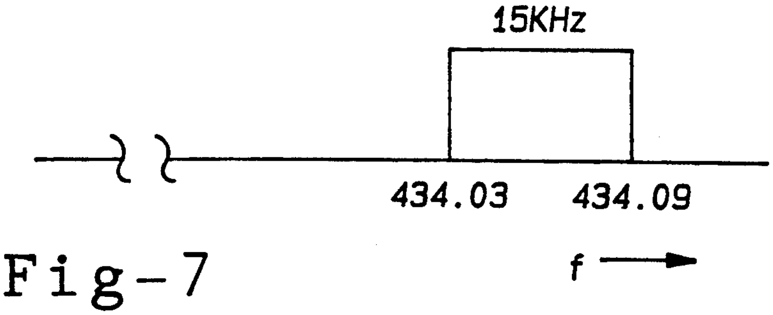
FIG. 7 is a linear representation of the modulated frequency signal of the present invention.

Oscillator circuit 18, shown in FIG. 2, comprises transistor Q1, resistors R1 and R2, in addition to capacitors C1 and C2. SAW1 stabilizes the frequency of oscillation of circuit 18 to preferably 434.09 MHz. SAW1 is a SURFACE ACOUSTIC WAVE RESONATOR having an equivalent model illustrated schematically in FIG. 3. Antenna 20 broadcasts the signal generated by circuit 18 for any duration which voltage is supplied to node N. The magnitude of voltage supplied to node N can be varied from B+ to any portion thereof by selection of any particular output or combination of microprocessor 14. For example; output A of microprocessor 14 includes resistor RA which provides a first magnitude bias voltage to oscillator 18. Output B of microprocessor 14 includes resistor RB which provides a second magnitude bias voltage to oscillator 18. If output A and B are both "on", a third magnitude bias voltage will be supplied to oscillator 18. In the preferred embodiment, RA and RB are 3.9K ohm resistors; a first bias is provided by output A; and a second bias is provided by the combination of outputs A and B. When output A is provided to bias oscillator 18, oscillator 18 produces a 434.09 MHz fixed frequency signal, as shown in FIG. 6. When the combination of outputs A and B is used to bias oscillator 18, a 434.03 fixed frequency signal is produced, also shown in FIG. 6. A modulated signal is provided by continuously supplying output A and switching output B at a 15 KHz frequency, as shown in FIG. 7. In this manner, a modulated frequency signal is produced which deviates between 434.03 and 434.09 at 15 KHz.

Figure 5:
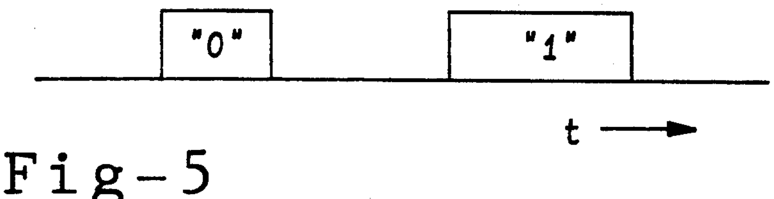
FIG. 5 is a linear representation of a digital zero and a digital one as used in the present invention.

The actual code used to transmit a signal for implementation of a command is produced using combinations and permutations of these signals in the form of a string of 54 bits, the entirety of which constitutes a friend/foe identification portion in addition to a specific command, such as to lock or unlock a door. In the preferred embodiment 8 bits provide friend/foe detection and the remainder provide the specific access command. Each bit comprises a signal consisting of a selectable width burst of a selectable signal. That is, the sequence of signals, fixed or modulated, and the digital value thereof, zero or one, depicts the actual code represented by each bit of the 54 bit data stream. The digital value of each bit is conveyed by its width. For example, a first width represents a zero and a second wider width depicts a one, as shown in FIG. 5. Utilizing such a stream of data, a 54 bit signal can be transmitted in 0.25 seconds and repeated to assure receipt and or verification. The modulated signal of the present invention incident upon a fixed frequency detector will be perceived as a fixed frequency signal if the deviation of frequency of the modulated signal is not great, i.e., less than 0.023%. The receiver of the present invention includes a modulating frequency detection portion which is sensitive enough to detect the presence or absence of a modulating frequency signal having a frequency deviation which is not larger than 0.023%. It has been determined by experimentation that a recording device sought to be used to provide unauthorized access to the system of the present invention will recognize and record the modulated signal as a fixed frequency signal; whereas the system of the present invention recognizes the small frequency deviation of the modulated frequency signal as a modulated signal. Thus, an unauthorized transmitter of a recorded signal will not include the modulated signal portion. Absence of the modulated signal prevents acceptance of the command thereby denying access of the unauthorized transmitter. Thus, the presence and sequence of fixed and modulated frequency signals are detected by the present invention. The presence and sequence of the fixed and modulated signals in combination with the use of variable duration signals representing digital zeros and one provides a large number of unique signatures to enhance the level of uniquencess of each system and thereby the security available with such systems.

A remote vehicle access command in the form of the pulse train described herein and broadcast by antenna 20 which is incident upon a fixed vehicle antenna 22 is amplified by radio frequency amplifier 24 by a magnitude of 10 dB. Oscillator 26 provides a signal which is mixed with the access command signal in mixer 28. Fixed frequency detector 32 and modulating frequency detector 34 receive a signal from mixer 38. Such signals are then processed by microprocessor 38. In the preferred embodiment, microprocessor 38 is a MOTOROLA MC68HC05P1. Microprocessor 38 accesses memory 39 an XC2400 manufactured by XICOR. Access commands are stored in memory 39 and compared in microprocessor 38 which receives signals. Upon encountering a match of the stored command, microprocessor 38 implements the respective command. Commands from outputs of microprocessor 38 in parallel with manual command inputs 36 effect actuation of:

a) driver door lock actuator 40;
b) unlock all actuators 42;
c) lock all actuators 44; or
d) dome light actuator 46.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A system within a remote signal transmitter capable of producing a radio frequency access command comprising:

said transmitter including;
an oscillator circuit;
a microprocessor including a first and second output for providing a respective first and second magnitude voltage to selectively bias said oscillator circuit;
said first magnitude voltage causing said oscillator circuit to produce a first fixed frequency signal;
said second magnitude voltage causing said oscillator circuit to produce a second fixed frequency signal;
said oscillator circuit producing a modulated frequency signal, said modulated frequency signal changing from said first fixed frequency to said second fixed frequency at a rate equal to a rate of change of bias between said first and second magnitude voltage as applied to said oscillator circuit;

said first fixed, said second fixed and said modulated frequency signals being combined with variable duration signals to produce a unique sequence to provide a data bit stream having a unique signature which corresponds to a unique command; and a transmitting antenna connected to said oscillator circuit for broadcasting said first fixed, said second fixed and said modulated frequency signals.

2. The system of claim 1 wherein said oscillator circuit is stabilized by a surface acoustic wave resonator.

3. The system of claim 1 wherein said oscillator circuit produces a first fixed frequency signal at 434.09 MHz and a modulated frequency signal which deviates between said first fixed frequency signal at 434.03 MHz and said second fixed frequency signal at 434.09 MHz at a rate of 15 KHz.

4. The system of claim 3 wherein said first fixed frequency signal has a first width representing a digital zero and a second width representing a digital one.

5. The system of claim 3 wherein said modulated frequency signal has a first width representing a digital zero and a second width representing a digital one.

6. The system of claim 3 wherein said first and said second fixed frequency have a different magnitude which is not greater than 0.023%.

7. The system of claim 1 further comprising:

a receiver including;

a receiving antenna upon which said first fixed, said second fixed and said modulated frequency signals broadcast by said transmitting antenna are incident;

a fixed frequency signal detector providing indicia of a detected fixed frequency signal;

a modulated frequency signal detector providing indicia of a detected said fixed frequency signal detector and said modulated frequency signal detector providing a series of detected signals comprising indicia of detected fixed frequency signals and indicia of detected modulated frequency signals, each of said detected signals of said series corresponding to receipt of said fixed frequency and said modulated modulating signals;

said series of detected signals provided to a microprocessor;

said microprocessor comparing said series of detected signals to stored series of signals; and said microprocessor implementing a command corresponding to said series of signals upon receipt of a match with said stored series of signals.

8. A remote vehicle access system utilizing a radio frequency signal for implementation of access commands; comprising:

a transmitter including;

means for selectively producing a first and a second fixed frequency means for generating a modulated frequency signal ranging from said first frequency to said second frequency;

said means for selectively producing a first and a second fixed frequency signal and said means for generating said modulated frequency signal producing a predetermined series of signals characterized by a sequence which provides a unique signature therefore;

a receiver including;

means for detecting the presence and sequence of said first and second fixed frequency signals and said modulated frequency signal;

means for comparing said presence and sequence of said first and second fixed frequency signals and said modulated frequency signal with stored signal presence and sequence data; and means for implementing a command if said stored signal presence and sequence data matches detected presence and sequence of said first and second fixed frequency signals and said modulated frequency signal.

9. The invention of claim 8 wherein said means for selectively producing a first and a second fixed frequency signal and said means for generating said modulated frequency signal comprises an oscillator circuit selectively biased by a microprocessor including first and second outputs, said first and second outputs respectively biasing said circuit to produce said first and second fixed frequency signals and changing between said first and second outputs to produce said modulated frequency signal.

10. The invention of claim 8 wherein said oscillator circuit is stabilized by a surface acoustic wave resonator.

11. The invention of claim 8 wherein said means for detecting the presence of said first and second fixed frequency signals comprises a fixed frequency signal detector.

12. The invention of claim 8 wherein said means for detecting the presence of said modulated frequency signal comprises a modulated frequency signal detector.

13. The invention of claim 8 wherein said means for detecting the presence and sequence of said first and second fixed frequency signals and said modulated frequency signal comprises a fixed frequency signal detector, a modulated frequency signal detector and a microprocessor.

14. The invention of claim 8 wherein said means for comparing the presence and sequence of said first and second fixed frequency signals and said modulated frequency signal comprises a microprocessor including memory having stored signal presence and sequence data.

15. The invention of claim 8 wherein said means for selectively producing a first and a second fixed frequency signal provides a first and a second fixed frequency signal which have a first width representing a digital zero and a second width representing a digital one.

16. The invention of claim 8 wherein said modulated frequency signal has a first width representing a digital zero and a second width representing a digital one.

17. The invention of claim 8 wherein said first and second fixed frequency have a different magnitude which is not greater than 0.023%.

* * * * *